Dec. 31, 1935.  G. H. MILLER  2,026,242
METHOD OF AND APPARATUS FOR TREATING BEEF CARCASSES
Filed Aug. 6, 1934  2 Sheets-Sheet 1
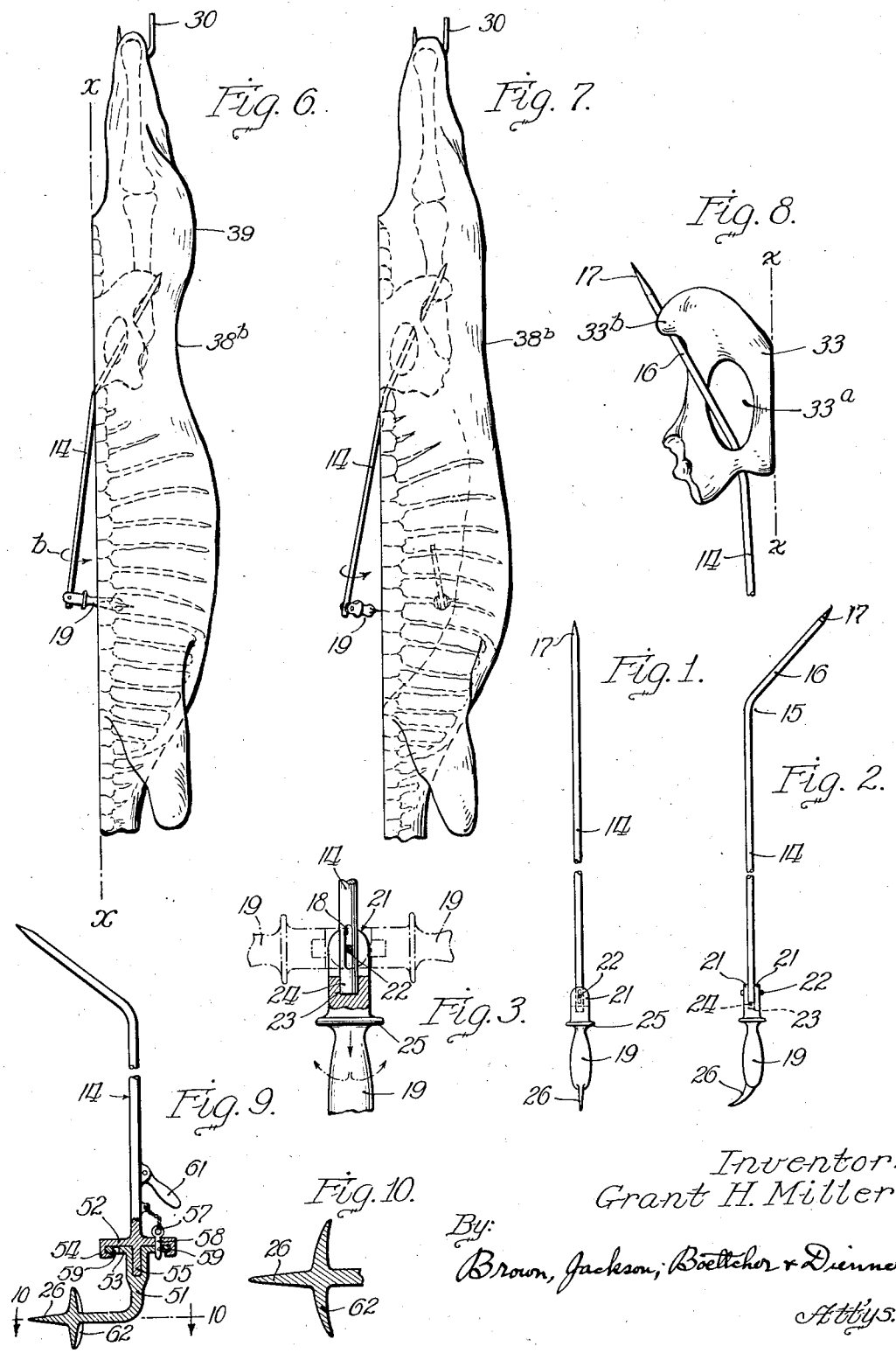

Dec. 31, 1935.  G. H. MILLER  2,026,242
METHOD OF AND APPARATUS FOR TREATING BEEF CARCASSES
Filed Aug. 6, 1934  2 Sheets-Sheet 2
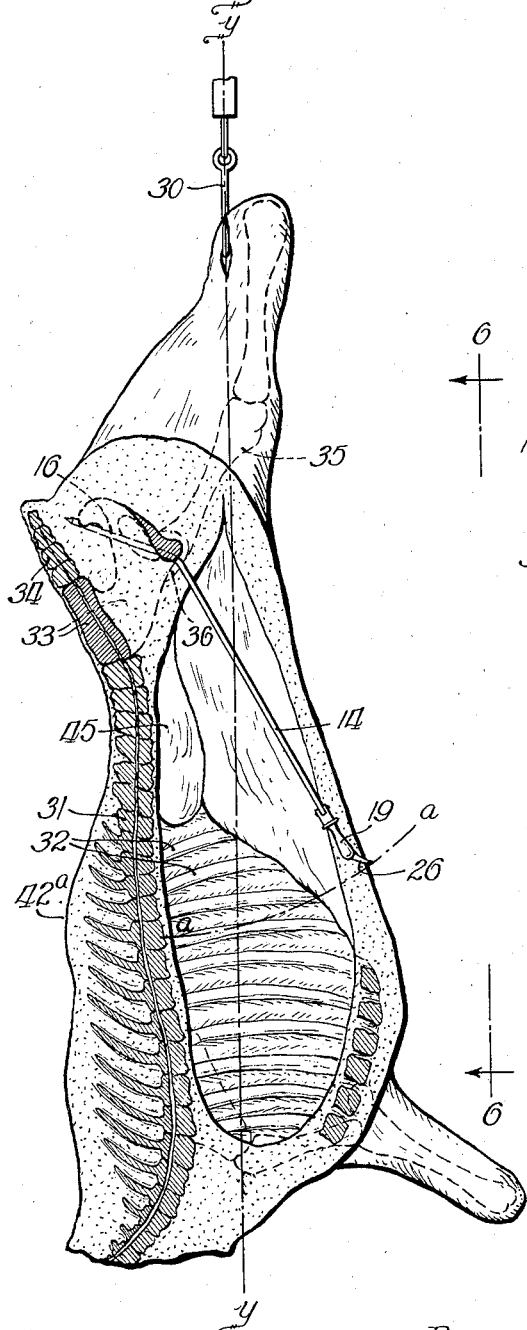
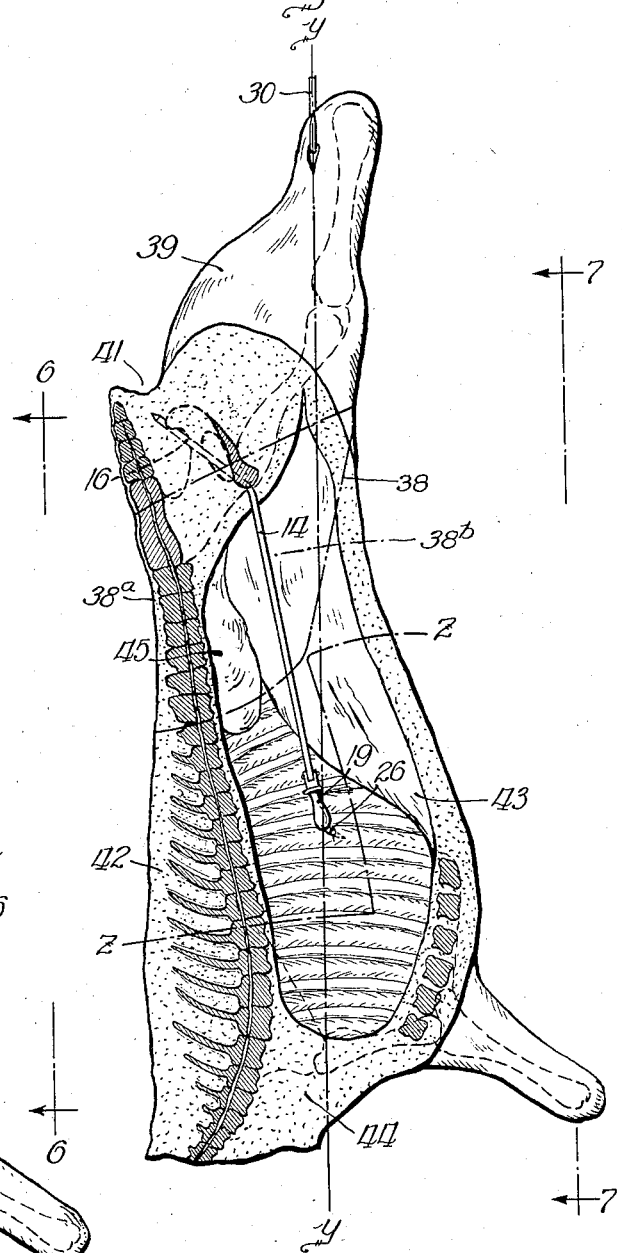
Inventor:
Grant H. Miller
By: Brown, Jackson, Boettcher & Dienner
Attys.

Patented Dec. 31, 1935

2,026,242

UNITED STATES PATENT OFFICE 2,026,242

METHOD OF AND APPARATUS FOR TREATING BEEF CARCASSES

Grant H. Miller, Caldwell, N. J.

Application August 6, 1934, Serial No. 738,618

28 Claims. (Cl. 17—44)

The present invention relates to an improved method of and apparatus for treating beef carcasses, and embodies improvements upon the inventions disclosed in my prior Patent No. 1,160,937, issued November 16, 1915, and in my prior Patent No. 1,614,312, issued January 11, 1927.

In conventional slaughter house practice, the carcass is suspended at each hind leg on overhead tracks for dressing and splitting. After the desired internal organs have been removed, the carcass is split down the chine or backbone into right and left halves. In some instances, the backbone is split unevenly, so that the portion of the backbone in one of the halves is thin, or the backbone may be cracked. The half of beef having this thin or cracked backbone will generally have a decided tendency to curve inwardly at the loin because of this weakened condition of the backbone.

Another reason for the inward curvature at the loin, irrespective of how the backbone has been split, or of the condition of the loin, follows from the practice of suspending each half of the beef carcass from the hind leg. By suspending the carcass in this manner, the weight of the forequarter is carried through the flank portion of the carcass, but the "rump" and "round" portions are not in line to be suspended through the flank, with the result that the weight of the rump and round portions bears downwardly on the upper end of the backbone and tends to cause the backbone to sag or curve inwardly. Another decided objection in the resulting shape of the carcass follows from the fact that the rump and round, through their lack of support, will often tend to swing laterally with respect to the vertical plane of the backbone, producing what may be termed a twisted carcass. Any of the above mentioned distorted shapes assumed by the carcass while warm will be retained when the carcass is chilled.

The general effect of this distortion of the carcass is that the loin will appear to be comparatively thin or hollow, and the entire carcass will appear comparatively rough and wasteful by reason of the wrinkles and folds that so often appear toward the nose of the loin and along the flank side of the loin; even though, in fact, the loin is full and in prime condition when the animal is alive on the hoof. The loin portion is one of the most expensive cuts in the carcass, and hence the inwardly curved condition of the loin detracts considerably from the apparent value of the carcass.

One of the general objects of the invention is to provide an improved method of and apparatus for straightening these carcasses or preventing the distortion thereof by utilizing a leverage principle which forces the loin outwardly in a direction to reduce the objectionable inward curvature. To facilitate description of the forces exerted on the carcass in the performance of my improved straightening methods, I shall refer to the plane of cleavage of the carcass as the plane in which the backbone is split, extending from the backbone through the belly, and I shall refer to the line of suspension as the vertical line passing from the point of support of the hind leg down through the forequarter. The above mentioned leverage force acts in a plane substantially parallel to the plane of cleavage, and forces the loin in a direction away from the line of suspension. In the preferred embodiment of my invention, a point of reaction for this leverage force is had in the rump or round portion and the leverage acting parallel to the plane of cleavage tends to rock the aitchbone and other portions of the chine bone, which action "plumps" both the round and the loin and reduces the hump that ordinarily appears in the prime rib section of the back. By reason of the pressure distributing action of the different portions of the chine bone, the leverage force is effectively distributed as an upwardly and outwardly acting force in the rump and in the loin section and as an inwardly acting force in the prime rib section, with reference to the line of suspension. Thus, the leverage tends to bring the rump, the loin and the prime rib section closer to a straight line, as viewed from the side of the carcass at right angles to the plane of cleavage.

Another object of the invention is to provide an improved method of and apparatus for straightening beef carcasses or preventing the distortion thereof by utilizing a torque or twisting principle which forces the rump and round in a direction laterally with respect to the plane of cleavage. When the round sags outwardly in a direction away from the plane of cleavage, the weight of the round pressing down on the loin tends to cup or dish the outer side of the loin inwardly so that the carcass appears gaunt, giving the impression it is a framey or hay belly carcass, all of which makes it appear to be more thin or "shelly" to a prospective buyer. By swinging the round back into its proper or original position substantially in the plane of cleavage, the objectionable hollow in this outer or mid side section of the loin is reduced or eliminated so that the loin has its proper appearance. The action of swinging the round back into its proper position is effected by a torque or twisting force transmitted through the same tool which transmits the above described leverage force to the loin and to the round.

Another object of the invention is to provide a carcass straightening tool which will have its upper point of engagement in the aitchbone of the carcass. The section of aitchbone in each side of beef has an opening therethrough, through which the upper end of the tool can be readily inserted. This opening in the aitchbone enables the upper end of the tool to be given an effective anchorage in the carcass for transmitting the leverage force substantially parallel to the plane of cleavage and for transmitting the torque or twisting force for swinging the round into its proper position.

Another object of the invention is to provide an improved carcass straightening tool which will be adaptable either to the right or to the left half of the beef carcass without any change of parts.

Other objects and advantages of the invention will be described later in the following detailed description of one preferred embodiment of the invention. In the accompanying drawings illustrating such embodiment:—

Figure 1 is an elevational view, corresponding to an edge view, of my improved tool;

Figure 2 is a side elevational view thereof;

Figure 3 is a detail sectional view through the handle portion of the tool;

Figure 4 is a side view of a typical beef carcass before the performance of any of my improved straightening operations thereon;

Figure 5 is a similar view showing the carcass after the leverage force has been applied thereto for rocking a portion of the chine bone;

Figure 6 is an edge view of the carcass before the performance of the torque or twisting operation thereon, this figure corresponding to a view taken on the plane of the line 6—6 of Figure 4;

Figure 7 is a similar view showing the carcass after the torque or twisting force has been applied thereto for straightening the carcass, this figure corresponding to a view taken on the plane of the line 7—7 of Figure 5;

Figure 8 is a perspective view showing the manner in which the tool engages the aitchbone;

Figure 9 is a side view, partly in section, showing a modified construction of tool; and Figure 10 is a sectional view taken on the plane of the line 10—10 of Figure 9.

The tool comprises a round bar or rod 14 having its upper portion bent at 15 to form the inclined upper leg or extension 16. The extremity of this upper extension or leg is pointed, as indicated at 17. The lower portion of the rod has a lengthwise slot 18 extending therethrough. This slot extends through the rod substantially in the same plane in which the offset upper end 16 extends. The handle 19 has a slotted inner end providing yoke side arms 21 which engage on opposite sides of the rod. A pin 22 passes through the slot 18 and through these yoke arms and has its ends riveted over on the outer sides of said arms. A socket 23 is formed in the handle at the base end of the yoke portion, this socket being of a size to receive the lower end 24 of the rod. The slot 18 permits the handle to be shifted longitudinally of the rod, and when the handle is swung into a position in prolongation of the rod, the handle can be shifted upwardly for seating the lower extremity 24 of the rod in the socket 23. In this position of the parts, the handle serves as a rigid extension of the rod whereby to facilitate holding and manipulating the rod in forcing the upper end thereof into the aitchbone of the carcass. A shoulder 25 on the upper end of the hand grip serves to enable upward thrusting pressure to be exerted with more force through the handle. When the handle is drawn downwardly to withdraw the rod end 24 from the socket 23, the handle can then be swung laterally to either side. Projecting diagonally from the outer extremity of the handle is a prong 26. This prong is adapted to be forced into the rib or plate section of the carcass for anchoring the lower end of the tool after the leverage force and the torque or twisting force have been exerted through the tool. With the handle swung to a position substantially at right angles to the length of the rod, a considerable twisting force can be transmitted through the rod by pressing the handle back in a circular path more or less about the axis of the rod. Swinging the handle up to an angular position at one side of the rod adapts the tool to use in a right side of beef, and swinging the handle up to an angular position at the opposite side of the rod adapts the tool to use in a left side of beef. Irrespective of whether the handle is swung to one side or the other, the prong 26 is still in effective position to be forced into the rib or plate portion of the carcass for anchoring the lower end of the rod. All parts of the tool are preferably constructed of stainless steel or other preferred noncorrosive metal.

Referring now to the views illustrating the carcass, the cleavage plane along which the carcass is split into right and left halves is indicated by the dash and dot line x—x in Figure 6. The vertical line of suspension passing from the upper supporting hook 30 down through the forequarter of the carcass is represented by the dash and dot line y—y in Figures 4 and 5. The skeleton of the carcass includes the chine or backbone 31, from the forward vertebrae of which extend the ribs 32. The aitchbone is indicated at 33, it being noted that this aitchbone is really a part of the backbone. Additional smaller vertebrae 34 extend rearwardly from the aitchbone through the rump and into the tail. The upper leg bone 35 of the hind quarter is articulated to the aitchbone at 36. The loin is indicated generally within the dash and dot area 38, which, for the purpose of the present description, may be regarded as comprising an edge portion 38a including the chine bone or edge of the carcass, and a side portion 38b located in the mid side section adjacent to or below the pin bone area. The "round" is indicated at 39 and the "rump" section is indicated at 41. In the forequarter of the carcass, the rib section is indicated at 42, the plate section at 43, and the chuck at 44. The kidney is illustrated at 45.

As best shown in Figure 8, that portion of the aitchbone 33 remaining in each side of beef after the splitting of the carcass contains a hole or "window" 33a, this being true of both steers and cows. This opening 33a faces generally upwardly approximately in the direction of the rump and lies facing slightly oblique toward the cleavage plane x—x. A protuberance 33b extends from an upper part of the aitchbone for the attachment of cartilage and tough ligament structure lying in the rump. The protuberance 33b affords an effective anchoring point under which the inclined part 16 of the tool can be hooked for transmitting leverage force and torque to better advantage. The engagement of the pointed extremity 17 in the cartilage and tough ligament structure also aids in anchoring this end of the tool.

Figure 4 illustrates a typical distorted condition of a carcass wherein the loin has fallen in, either due to a broken or thin chine bone or to the distribution of weight, including the weight of the round 39 pressing downwardly and curving the loin inwardly. In the use of my improved tool, the handle 19 is arranged in rigid prolongation of the rod, with the lower extremity 24 of the rod engaging in the socket 23, and the inclined pointed end 16 of the rod is thrust upwardly into the carcass for passing this end of the rod through the opening 33a of the aitchbone, this operation being performed from the inner side of the half of beef, as illustrated in Figure 4. When the tool is properly inserted through the eye or opening of the aitchbone, the upper part of the inclined portion is preferably hooked under the protuberance 33b. Such engagement of the tool in the aitchbone compels the aitchbone to rock or swing with the tool. By now pressing the lower handle end of the rod inwardly for movement along an arc $a$—$a$ in a plane parallel to the cleavage plane of the carcass, a powerful leverage force can be exerted on the aitchbone to press the lower end of said bone outwardly in a direction away from the line of suspension $y$—$y$. This forces the curved loin portion 38a in an outward direction for bringing this part of the loin more nearly into line with the forequarter and hind quarter of the carcass, substantially as indicated in Figure 5. The relatively firm attachment of the adjacent vertebrae 31 lying below the aitchbone has the effect of causing these adjacent vertebrae to press outwardly on the curved part of the loin, whereby these vertebrae assist the aitchbone in avoiding the objectionable inward curvature of the loin. The leverage force transmitted through the rod creates a reaction in the upper part 33b of the aitchbone and in the round 39, tending to throw the round in a direction generally upwardly, whereby the round is made more full or plump, as shown in Figure 5. The raising of the round in this direction aids in reducing or eliminating the objectionable inward curvature in the loin, and the shifting of the weight of the round in this direction transposes the weight thereof to a point where it has less tendency to curve the loin. The resulting change in the general shape of the chine bone and of the back profile edge of the carcass also has the effect of reducing the appearance of any decided hump 42a in the prime rib section.

The above described operation has solely to do with creating straightening forces in the carcass in a plane substantially parallel to the cleavage plane $x$—$x$ for the purpose of straightening the back profile edge of the side of beef. Where this is the only operation which it is desired to perform on the carcass, the handle 19 of the tool is now swung around into a position approximately at right angles to the rod and the spur 26 is forced into the rib section 42 between the ribs 32. The lower end of the tool is thereby anchored in place. The handle may be tipped upwardly or downwardly at different angles to the axis of the rod in order to find an appropriate spot between adjacent ribs 32 for impinging the spur in the carcass.

Referring now to that method step of my invention which utilizes a deliberately established torque or twisting force in the tool (aside from any inherent twisting force which may arise from the fact that the point of anchorage of the spur is offset laterally from the line of leverage reaction of the rod), it will be evident that when the handle 19 is tipped up inwardly from the rod toward the rib section, it will be possible to exert a heavy torque force through the rod by rotating the handle through a substantially horizontal arc at right angles to the axis of the rod. That is to say, the rod can be turned or twisted in the direction typically represented by the arrow $b$ in Figure 6. Such torque force may be used to correct a twisted condition of the carcass, such as 20 is shown in Figure 6. This condition manifests itself by a pronounced inward curvature of the flat or outer side 38b of the loin in the mid side section of the carcass. In most instances, said condition arises from the weight of the round 39 causing the round to sag outwardly and downwardly, in a direction generally away from the plane of cleavage, thereby giving the appearance of a hollow or thin loin at the side portion 38b when, in fact, the loin may be full and plump. When a twisting force is transmitted through the rod in the direction of the arrow $b$, the inclined upper end 16 of the rod functions in the manner of a crank extension for transmitting this twisting force to the round 39. The engagement of the inclined end 16 of the rod in the opening 33a of the aitchbone and the hooked engagement of the rod under the protuberance 33b, together with the engagement of the pointed extremity 17 of the rod in the cartilage and tough ligament structure adjacent to said protuberance, establishes effective anchorage of the rod for transmitting this twisting force to the round. The action is to swing the round 39 and the upper end of the aitchbone 33 in a direction toward the plane of cleavage $x$—$x$ so as to shift the weight of the round to a point where it will not tend to cause the objectionable curvature in the side portion 38b of the loin. At the same time, the twisting force serves to shift the lower end of the aitchbone, together with the adjacent vertebrae extending from this end, in a direction outwardly away from the plane of cleavage. This tends to fill out the side portion of the loin, particularly to plump out the midsection of the loin, just below the pin bone. The straightening effect produced by this twisting action of the tool is substantially illustrated in Figure 7, where the objectionable inward curvature of the side of the loin is greatly reduced or eliminated. The straightening effect produced by the leverage action and by the twisting action also removes the objectionable wrinkles and folds that so often appear toward the nose of the loin and along the flank side of the loin. After the desired amount of twisting has been transmitted to the rod, the spur 26 is forced into the carcass in the manner above described. The anchorage afforded by the spur serves the twofold duty of holding the rod at the desired point to which it has been swung along the arc $a$ in its leverage manipulation, and of holding the rod in the twisted position to which it has been oscillated around in the arc $b$ in its torque manipulation. It will be evident that the tool has the same utility when used with the opposite side of the beef carcass, the handle being then tilted up to the opposite side of the rod for properly disposing the spur to engage in the rib section of this side.

In Figures 9 and 10 I have illustrated a modified construction of tool wherein the prong 26 can be set in different angular positions about the axis of the rod 14. The spur or prong is formed as a part of a handle member 51 which can swivel about the axis of the rod 14. The rod and handle member have two coacting abutting flanges 52 and 53, one of said flanges having a rim or lip 54 turned inwardly to embrace the back side of the other flange and prevent the parts from separating. An extension 55 of the rod has rotatable bearing support in a socket formed in the handle member. A locking pin 57, having chain attachment to the rod, is adapted to pass down through a hole 58 in the top flange 52 and to engage in any one of a closely spaced series of holes 59 in the lower flange 53 for locking the prong 26 in any desired angular relation to the rod. A handle 61 on the rod enables the torque twist to be applied to the rod. A contact bearing member 62 is formed at the shank end of the prong 26, the prong projecting substantially from the center thereof. The bearing member is preferably in the form of a relatively large oval plate having its major axis horizontal and having its outer surface slightly convex to conform to the general concave contour of the rib section 42 on the inside of the carcass. In the use of this construction of tool the leverage force is applied in the manner previously described. In applying the torsional twist the rod 14 is rotated through the handle 61 and after the desired shape has been given to the carcass the pin 58 is inserted into the proper hole 59 for locking the prong 26 at such angle to the rod as will position the prong properly for penetration in the carcass. It will be noted that this construction is adaptable to use with carcasses wherein the round has sagged inwardly relatively to the plane of cleavage x—x, and which it may be desired to straighten by throwing the round outwardly. The bearing member 62 at the inner end of the prong establishes a bearing contact with the carcass which can resist torsional stress acting in either direction in the rod.

It will be understood that in the performance of my improved method and in the use of either of the above described embodiments of tools, the tool is applied to the carcass while the latter is still warm with its animal heat, and the shaping operations are performed while the carcass is still warm. Thereafter, the carcass is chilled in a cooling room. The tool is left in the carcass until after the carcass has become set by chilling, whereupon the tool is removed. The straightened or corrected shape of the carcass is substantially retained after the carcass has become set.

The present form of my invention has certain salient advantages over the devices disclosed in my prior Patents Nos. 1,160,937 and 1,614,312. The devices disclosed in said prior patents have been used successfully by different packing houses over a long period of years in the treatment of thousands of carcasses and the practical experience gained thereby has shown certain additional desiderata which prompted my invention of the present method and apparatus. For example, the tool itself is much more simple in construction and is more quickly and easily applied to the carcass. Also, it does not form indentations or marks on the back of the carcass nor can it deform the rib portion of the carcass, such as was sometimes true in the employment of the device illustrated in my Patent No. 1,160,937. Furthermore, the present invention does not have any tendency to stretch the ribs 32 apart or force any of these ribs downwardly, as is sometimes true in the use of the jack type of tool illustrated in my other Patent No. 1,614,312. The present invention also has greater adaptability to the carcasses of kosher kills than the jack type of tool. In most instances, when the carcass is cut for kosher meat, only the plate 43 and chuck 44 constitute the kosher meat, this corresponding to that portion of the carcass lying forward and below the kosher line approximately indicated at z—z in Figure 5. This portion of the carcass is cut away before the carcass is chilled and hence is not available for anchoring any straightening tool preparatory to the chilling operation. The removal of the plate and chuck from the carcass does not, however, interfere with the use of the present type of tool herein disclosed because the spur 26 has an effective point of engagement in the rib area 42. In some instances, the use of the jack type of tool illustrated in my prior Patent No. 1,614,312 was made complicated in the case of kosher carcasses from which the plate and chuck had been removed, owing to the difficulty of establishing a point of reaction for the lower end of the jack, and to the lessened strength of the cut ribs for withstanding the thrusting pressure of the jack.

The operation of deflecting the round laterally for proper positioning with respect to the plane of cleavage, to the end of reducing or eliminating the inward curvature at the side portion 38b of the loin (Figure 6), also has advantageous cooperation with the placing of the shroud or cloth on the carcass for the bleaching operation. This shroud consists of a large piece of cloth which is placed over substantially the entire outer side of the half of beef for the purpose of bleaching the flesh to a desirable color. This shroud is stretched relatively taut and is fastened to the carcass by skewer pins or the like. Wherever the shroud cloth does not have contact or proximate contact with the carcass, no substantial bleaching action will occur and, hence, this area will appear as a discoloration with respect to the remainder of the carcass. When the side portion 38b of the loin has a pronounced inward curvature, substantially as illustrated in Figure 6, it is difficult, if not impossible, to maintain contact of the shroud cloth with this inwardly curved part of the carcass. In such instances, it is common for an air pocket to develop under the shroud cloth in and around the pin bone section of the loin quite soon after the shroud cloth is applied to the carcass, and the area corresponding to this air pocket will be subjected to little if any bleaching action, with the result that it will appear as a discoloration with respect to the remainder of the carcass. However, when the round 39 is thrown laterally inwardly toward the cleavage plane and the side portion of the loin is thrown outwardly by the torque force exerted through the tool, substantially to the relation illustrated in Figure 7, it is much easier to obtain direct or proximate contact of the shroud cloth over the entire loin area of the carcass, for a uniform bleaching of the entire carcass.

Another advantage characterizing my invention is that the treatment of the carcass in the manner above described is also beneficial in reducing the liklihood of the round becoming sour. It is my opinion that in many instances the souring of the round is directly attributable to the angle at which the round is held with respect to the remainder of the carcass when the carcass is suspended from the hind quarter. It appears logical that when the round and hind leg are stretched out at the angle necessarily assumed when suspending the carcass in this manner, there is some tendency to constrict the arteries and blood vessels in the round and particularly near the aitchbone, with the result that in some instances the blood is not as freely discharged from the round as it is from other parts of the carcass. This is borne out by the fact that quite frequently in inserting my improved carcass straightening tool through the opening in the aitchbone and rocking the aitchbone and round in the operation of straightening the carcass, blood will flow from the aitchbone and round down along the tool, indicating that blood was constricted in the round by the suspension of the carcass from the hind quarter.

While I have illustrated and described what I regard to be the preferred method of and apparatus for carrying out my invention, nevertheless it will be understood that such are merely exemplary and that numerous modifications may be made therein without departing from the essence of the invention.

I claim:—

1. In apparatus for treating an animal carcass, a tool comprising means for engaging a part of the bone structure of the carcass, said entire tool being adapted to be actuated bodily as a lever for changing the shape of a portion of the carcass, and means for securing said tool in its actuated position.

2. A device for treating an animal carcass comprising a lever, means at one end of said lever for substantially fixedly engaging a part of the bone structure of the carcass, said lever being adapted to be swung bodily to a position effective to change the shape of a portion of the carcass by leverage force, and means adjacent to the other end of said lever adapted for engagement with said carcass for holding the lever in said latter position.

3. A device for treating a beef carcass comprising a lever, an angular formation at one end of said lever for establishing relatively fixed engagement with the aitchbone portion of the carcass, the other end of said lever being adapted to be swung to a position for changing the shape of a portion of the carcass solely by leverage force, and a prong adjacent to the latter end of said lever for engaging in the carcass for holding said lever in said latter position.

4. A device for treating an animal carcass comprising a rod, an angular extension at the upper end of said rod for engaging a part of the bone structure of the carcass, said rod being adapted to be actuated as a lever for changing the shape of a portion of the carcass, a handle pivotally connected with the lower portion of said rod, and a prong on said handle adapted to be engaged in the carcass for holding said rod in its actuated position.

5. A device for treating an animal carcass comprising a tool having means for establishing an engagement with a part of the bone structure of the carcass effective for transmitting a twisting force thereto, and means for transmitting a torsional twist through said tool for changing the shape of a portion of the carcass.

6. A tool for treating an animal carcass comprising means adjacent to one end of said tool for engaging a part of the bone structure of the carcass, means for rotating the tool to transmit a torsional twist through said tool for changing the shape of a part of the carcass without stretching the backbone of the carcass, and means for securing said tool in its rotated position.

7. A tool for treating the half of a split beef carcass comprising means adjacent to one end of said tool for establishing relatively fixed engagement with the opening in the aitchbone to one side of the plane of splitting of the carcass, manually actuated means adjacent to the other end of said tool for transmitting a torsional twist through said tool for changing the shape of a portion of the carcass independent of any stretching of the backbone of the carcass, and means engaging with the carcass for holding the tool in its twisted position.

8. The method of treating an animal carcass which comprises engaging a portion of the bone structure of the carcass, exerting a leverage force thereon for rocking said portion of the bone structure substantially in the plane of cleavage of the carcass and thereby changing the shape of the carcass, and substantially retaining the changed shape of the carcass until the carcass has become set.

9. The method of treating an animal carcass which comprises engaging a portion of the chine bone in the hind quarter of the carcass, exerting a leverage force thereon for rocking said portion of the chine bone and thereby changing the shape of the carcass substantially without stretching the chine bone, and retaining the leverage force on said portion of the chine bone until the carcass has become set.

10. The method of treating a beef carcass which comprises engaging the aitchbone of the carcass, exerting a leverage force thereon for rocking said aitchbone and thereby changing the shape of the carcass, and substantially retaining the changed shape of the carcass until the carcass has been chilled.

11. The method of treating an animal carcass which comprises engaging a portion of the bone structure of the carcass, exerting a twisting force thereon for changing the shape of a portion of the carcass independently of any stretching of the backbone of the carcass, and substantially retaining the changed shape of the carcass until the carcass has been chilled and become set.

12. The method of treating a beef carcass which comprises engaging a portion of the chine bone in the hind quarter of the carcass to one side of the plane of cleavage of the carcass, exerting a twisting force thereon and thereby changing the shape of the carcass, and retaining the twisting force on said portion of the chine bone until the carcass has become set.

13. The method of treating a beef carcass which comprises engaging the aitchbone of the carcass, exerting a twisting force thereon and thereby changing the shape of a portion of the carcass, and substantially retaining the changed shape of the carcass until the carcass has been chilled and become set.

14. The method of treating a beef carcass side which has been cut from the whole carcass along a plane of cleavage extending substantially through the center of the chine bone, which comprises engaging a tool with the chine bone at a point near the loin of the carcass, rocking this tool as a lever in a plane substantially parallel to said plane of cleavage whereby to force outwardly a portion of said chine bone in the loin section of the carcass, and substantially retaining this changed shape of the carcass until after the carcass has become set.

15. The method of treating a suspended beef carcass side cut from the whole carcass along a a plane of cleavage extending substantially through the center of the chine bone, which comprises extending a tool through the opening of the aitchbone, rocking this tool as a lever in a plane substantially parallel to said plane of cleavage, whereby to rock said aitchbone and to displace the loin portion of the carcass in a direction outwardly away from the line of suspension, and anchoring the tool to the carcass in this rocked position until after the carcass has been chilled.

16. The method of treating a beef carcass side which has been cut from the whole carcass along a plane of cleavage extending substantially through the center of the chine bone, which comprises engaging a tool with the chine bone at a point in the hind quarter of the carcass, twisting this tool as a torque rod whereby to displace the round of the carcass relatively to said plane of cleavage independently of endwise tension in the chine bone, and substantially retaining the changed shape of the carcass until after the carcass has been chilled and become set.

17. The method of treating a beef carcass side which has been cut from the whole carcass along a plane of cleavage extending substantially through the center of the chine bone, which comprises passing a tool through the opening in the aitchbone to one side of said plane of cleavage, twisting this tool as a torque rod whereby to displace the round of the carcass in a lateral direction with respect to said plane of cleavage, anchoring said tool to the carcass in this twisted position, and chilling the carcass to set the shape established by said twisting operation.

18. A tool for treating an animal carcass comprising a rod having an inclined upper end for engaging a part of the bone structure of the carcass, a handle movably connected with the lower portion of said rod for shifting to positions at opposite sides of said rod, and a prong on said handle for engaging in the carcass.

19. A tool for treating an animal carcass comprising a rod having an inclined upper end portion for engaging a portion of the backbone of the carcass, a slot in the lower portion of said rod, a handle having a pin engaging in said slot, said handle being movable to a position substantially in prolongation of said rod, and to positions at opposite sides of said rod, means for holding said handle in substantially rigid relation to said rod when in prolongation thereof, and a prong on said handle for engaging in the carcass.

20. A tool for treating an animal carcass comprising a rod, means at the upper end of said rod for engaging a part of the animal carcass, a base member having swiveling attachment to the lower portion of said rod for swiveling movement into different angular positions about the axis of said rod, means for locking said base member to said rod in different angular positions of adjustment, and a prong on said base member for engaging in the carcass.

21. In apparatus for treating an animal carcass, a tool comprising one portion effective to engage the bone structure of the carcass at spaced points whereby upon rocking the tool as a lever into a carcass-straightening position the engaged portion of the bone structure is compelled to rock substantially therewith, and means for holding the tool in said carcass-straightening position.

22. In apparatus for treating a suspended beef carcass side, a rod comprising an end portion effective to engage the chine bone at a plurality of points spaced vertically from each other whereby upon rocking said rod as a lever in a plane substantially parallel to the plane of cleavage of the carcass, the engaged portion of the chine bone is compelled to rock substantially therewith, and means for holding said rod in its rocked position.

23. In apparatus for treating a beef carcass side cut from the whole carcass along a plane of cleavage extending substantially through the center of the backbone, a tool comprising an end portion insertable through the "window" of the aitchbone along a plane substantially parallel to and spaced inwardly from said plane of cleavage, whereby upon swinging the other end of said tool into a loin-straightening position the aitchbone will be rocked in a plane substantially parallel to said plane of cleavage, and means associated with the latter end of said tool and cooperating with the carcass for holding the tool in said loin-straightening position until after the carcass has become set.

24. In apparatus for treating an animal carcass side cut from the whole carcass along a plane of cleavage extending substantially through the center of the backbone, a tool comprising means for effecting attachment to the carcass such as will compel the engaged portion of the carcass to rock substantially with the tool when the tool is rocked in a plane approximately parallel to said plane of cleavage, and means for holding the tool in said rocked position.

25. In apparatus for treating animal carcasses, a tool comprising means for engaging the carcass and actuatable as a lever for changing the shape of the carcass without the introduction of substantial tensile stresses in the backbone of the carcass, and means for holding the tool in position effecting the desired change in the shape of the carcass.

26. The method of treating an animal carcass which comprises engaging a tool with one portion of the carcass, rocking the tool as a lever to displace the latter portion of the carcass relatively to other portions thereof and without introducing substantial tensile stresses in the backbone of the carcass, and substantially retaining this changed shape of the carcass until after the carcass has become set.

27. The method of treating a beef carcass side which comprises first establishing relatively firm anchorage between one end of a lever and a portion of the backbone of the carcass, then swinging the lever in a plane substantially parallel to the plane of cleavage of the carcass to displace the latter portion of the backbone relatively to other portions of the carcass, and then holding the carcass in substantially this changed shape until after the carcass has become set.

28. The method of treating a beef carcass side which comprises extending a tool through the "window" of the aitchbone along a plane substantially parallel to and spaced inwardly from the plane of cleavage of the carcass, then rocking the tool as a lever to rock the aitchbone in a plane substantially parallel to said plane of cleavage, and substantially retaining this changed shape of the carcass until after the carcass has become set.

GRANT H. MILLER.